United States Patent [19]
Brown et al.

[11] 4,123,165
[45] Oct. 31, 1978

[54] ATTITUDE DETERMINATION USING TWO COLOR, DUAL-SWEEPING LASER SYSTEM

[75] Inventors: David B. Brown, Huntsville; Jerry W. Vickers, Toney, both of Ala.; Kynric M. Pell, Laramie, Wyo.

[73] Assignee: The United States of America as represented by the Secretary of the Army, Washington, D.C.

[21] Appl. No.: 801,885

[22] Filed: May 31, 1977

[51] Int. Cl.² ............................................. G01B 11/26
[52] U.S. Cl. ................................ 356/152; 250/203 R; 250/226; 356/141
[58] Field of Search ............................. 356/141, 152; 250/203 R, 226

[56] References Cited

U.S. PATENT DOCUMENTS

| | | | |
|---|---|---|---|
| 3,484,167 | 12/1969 | Burns, Jr. | 356/5 |
| 3,541,338 | 11/1970 | Duda et al. | 356/152 |
| 4,003,659 | 1/1977 | Conard et al. | 356/152 |
| 4,007,991 | 2/1977 | Robertsson | 356/152 |
| 4,020,339 | 4/1977 | Gustafson | 356/152 |
| 4,047,816 | 9/1977 | Pell et al. | 356/152 |

Primary Examiner—S. C. Buczinski

Attorney, Agent, or Firm—Nathan Edelberg; Robert P. Gibson; Freddie M. Bush

[57] ABSTRACT

A system is provided for remote determination of the attitude of a vehicle. Onboard the vehicle are located two separate arrays of corner cube retroreflectors. Each array of retroreflectors is arranged to form a band around the vehicle at one axial position. The two arrays of reflectors incorporate different optical filters so that each array of reflectors and filters is optimized to provide retroreflection in a particular narrow band of the optical spectrum. Each array's optical spectrum band is different from the band used by the other array of reflectors. The system utilizes a remotely located transmitting-receiving station to provide tracking of the vehicle, continuously sweeping the vehicle with a light source located at the station so that position and attitude of the object, relative to the remote station, are obtained. Included at the ground station are two multi-mode, continuous wave lasers each providing a single two-color beam which matches the bands of the spectrum of the filtered retroreflecting arrays onboard the vehicle. The time intervals between the pulse receptions from the colored retroreflecting arrays provide the data to determine the vehicle attitude.

6 Claims, 7 Drawing Figures

ATTITUDE DETERMINATION USING TWO COLOR, DUAL-SWEEPING LASER SYSTEM

DEDICATORY CLAUSE

The invention described herein may be manufactured, used, and licensed by or for the Government for governmental purposes without the payment to us of any royalties thereon.

BACKGROUND OF THE INVENTION

The measurement of flight vehicle dynamics such as pitch, yaw, and roll can be obtained using both onboard and earth-based instrumentation. Onboard systems, such as gyroscopic platforms and accelerometers require related transmission systems to communicate to earth-based stations or on-board recorders. The onboard systems are expensive and are usually destroyed with the vehicle after one flight. Ground based measurement systems employ photographic tracking methods or several tracking stations for triangulation measurements.

Laser radars are established in prior art teachings for determining a flight vehicle position or range with automatic laser trackers, related receivers, and retroreflectors. In "Radar Handbook" by M.I. Skolnik, McGraw-Hill Book Company, 1970, Chapter 37 discloses laser radars in detail. For example, page 37–62 shows laser tracking interconnected with a computer and tracking mount. In describing motion of a flight vehicle the variables that are involved are related to vehicle position, roll rate, and attitude rates. Prior techniques of measuring these variables have used radar or laser radar and triangulation with two or more ground stations or high speed camera trackers and triangulation from two or more camera stations.

SUMMARY OF THE INVENTION

Attitude of a flight vehicle is obtained using a laser transmitter/receiver station to track color coded retroreflectors on the vehicle. A single laser transmitter/receiver station has two multimode continuous wave lasers with beams modified using optical components to provide a beam cross-section which is approximately rectangular with one dimension significantly different from the other. The two laser beams are swept at a constant (known) angular rate across the flight vehicle's retroreflectors causing four discrete return pulses to be returned to the ground station. A two color (frequency) beam of the type required can also be generated using a single laser source, beam splitter and appropriate optics and filters. For a vehicle in flight, when the vehicle is illuminated, the color coded beams of retroreflected energy sweeps the ground station providing a delta time interval which is dependent upon the attitude of the flight vehicle. These reflected laster pulses are detected and processed to resolve the position, and attitude (pitch and yaw) data. The two color, dual-sweeping laser system allows the attitude of a flight vehicle to be determined from only one tracking station.

DESCRIPTION OF THE PREFERRED EMBODIMENT

Figure 1:
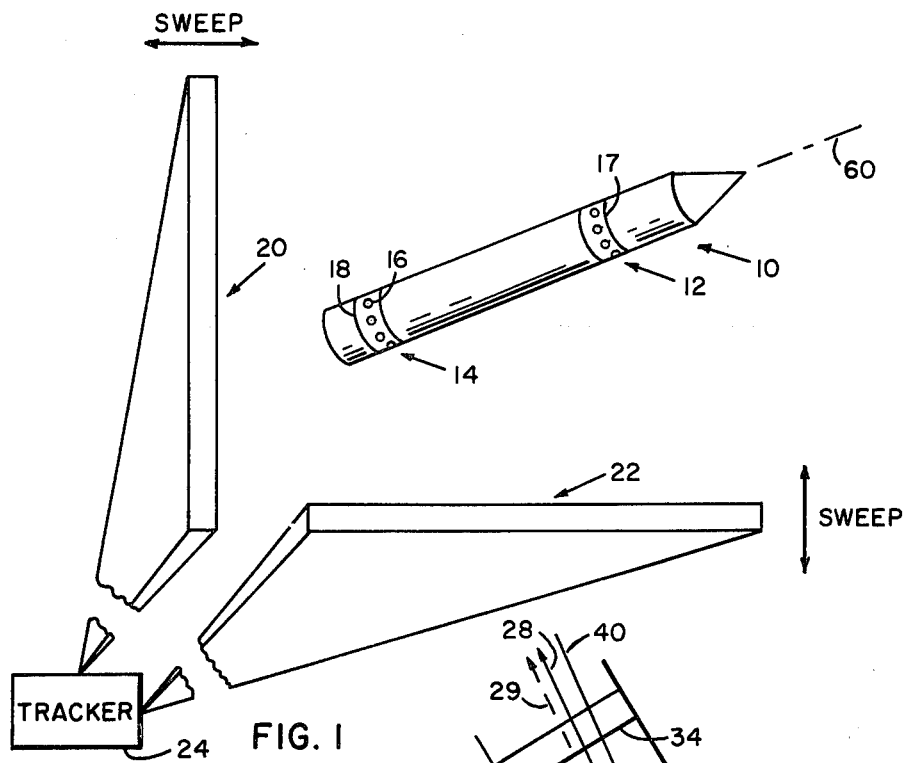
FIG. 1 is a diagrammatic illustration of a system for carrying out the method of vehicle attitude determination.

Referring now to the drawings wherein like numerals represent like parts, FIG. 1 discloses a block diagram of a system utilizing the tracking and attitude measurement method employing two color, dual sweeping lasers and two color coded arrays of retroreflectors. In the system of FIG. 1, a flight vehicle 10 is banded arrays of laser retroreflectors 12 and 14. Each array 12 and 14 comprises a multiplicity of corner cube reflectors 16 which incorporate different optical filters 17 and 18 thereover so that each array provides retroreflection in a particular narrow band of the optical spectrum. Thin laser beams 20 and 22 are formed and controlled by the ground station tracker 24 to sweep in synchronization across retroreflector arrays 12 and 14 for reflecting discreet data signals to the ground station receiver.

Figure 2:
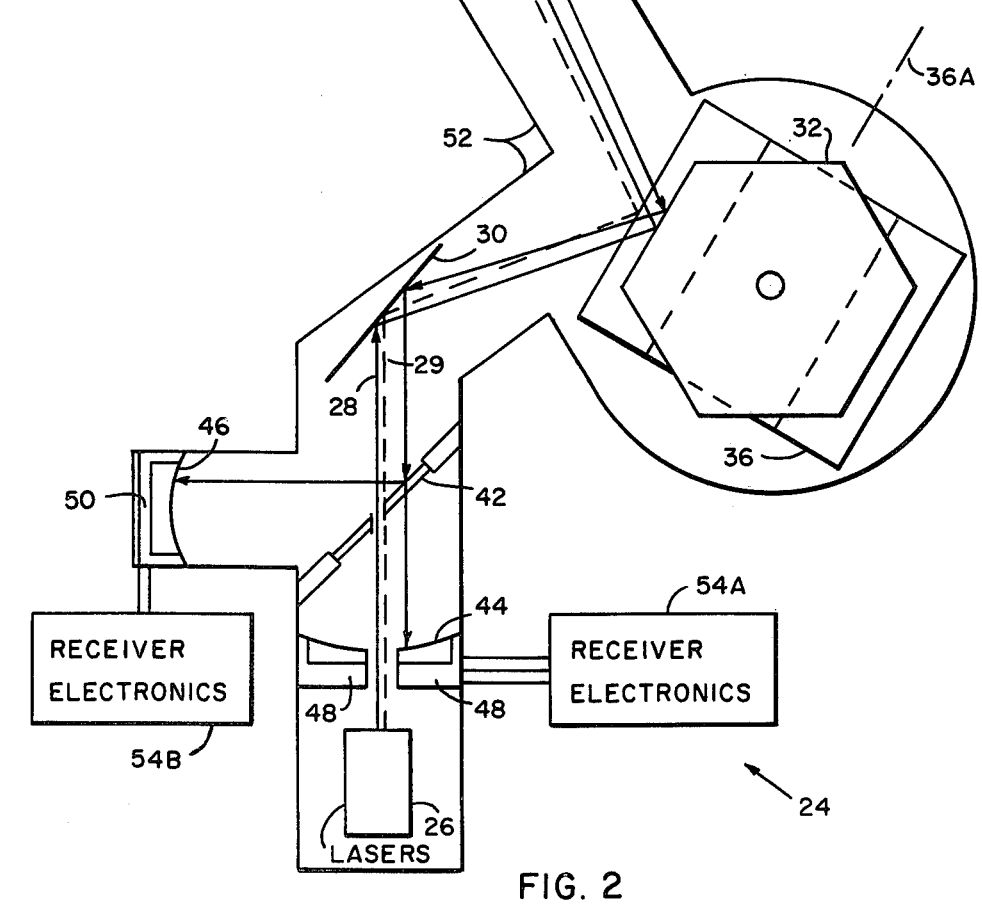
FIG. 2 is a diagrammatic illustration of the ground station system for carrying out the method of vehicle attitude determination.

FIG. 2 discloses a block diagram of a preferred embodiment of a ground station 24 for vehicle attitude determination utilizing the two color, dual sweeping laser system. In the ground system of FIG. 2, a laser 26 generated light beam 28 lies in a particular narrow frequency band of the optical spectrum. The beam 28 is directed by a turning mirror 30 onto a variable, controlled speed, rotating, multiple faceted mirror array 32 from which it is directed through beam divergence optics 34 to convert the beam shape to a thin, rectangular cross-sectioned beam. The rotating multiple faceted mirror 32 serves to create a rapidly sweeping beam. Retroreflected laser beam 40 impinges on optics 34 and is directed by mirrors 32 and 30 to filter 42. Filter 42 either passes the beam to focusing mirror 44 or reflects the beam to focusing mirror 46, depending on the beam color. From mirrors 44 or 46 the reflected beam is directed onto the receiver detector (photo-sensitive detective material) 48 or 50 respectively (depending upon the beam color as separated by filter 42). The housing 52 provides environmental control for the laser and optical system. The receiver electronics 54A and 54B are coupled to respective photo-sensitive detectors 48 and 50 and converts the respective retroreflected laser pulses into discrete time pulses. The receiver electronics circuits may then output data (not shown) to recording equipment, guidance and control signal circuits or other load and tracking circuit. Laser beam 28 is adapted by optics 32 to provide a vertical sweep. A beam 29 generated by a laser (not shown) adjacent laser 26 impinges on mirror 30 and a rotating mirror 36 mounted below or above the plane of beam 28. Mirror 36 is adapted for rotation about an axis 36A. Beam 29 is also coupled through beam diverging optics identical with opitcs 34 to provide a horizontal sweeping beam. A pair of laser beams — two color, dual oscillating — permits near real time determination of a flight vehicle performance of either a rolling or non-rolling flight vehicle, while using only one tracking station.

Alternatively the laser transmitter can utilize only one laser beam which is split by optics into equal beam portions, with one half of the beam color coded, polarized, or otherwise coded for separate detection from the other half of the laser beam, fulfilling the two color requirement for this system. As shown in FIG. 2, the transmitting and receiving beam optics are common. While this does provide an accurate system it may be more convenient to completely separate the receiving system from the transmitting system, placing one adjacent the other. Thus the transmitter would use the optical links 30, 32, and 34 as shown and described while the receivers 54 would have the retroreflected beams coupled directly thereto through appropriate optics.

A single ground station provides both vertical and horizontal oscillating laser beams. The ground station will utilize automatic tracking of the flight vehicle as is well established. Typical of prior art systems requiring range, azimuth, and elevation data is that provided with pulsed lasers by R. G. Conard and K. M. Pell in U.S. Pat. No. 4,003,659, issued Jan. 18, 1977. Mr. Pell is also a co-inventor in the instant invention. The Conard et al patent additionally discloses a triangulation system which utilizes plural ground based tracking stations to obtain attitude detection and correction of a missile with respect to a predetermined trajectory.

Figure 7:
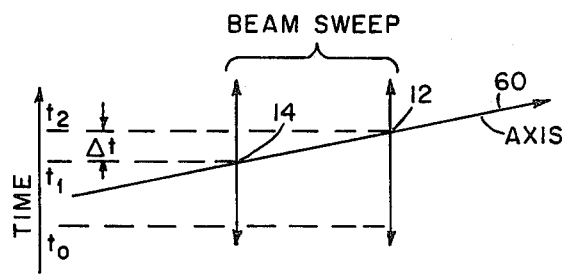
FIGS. 6 and 7 are geometry schematics identifying the mathematical relationship of the vehicle and ground station from the retroreflected, recorded data from the laser attitude measurement system.

During operation, the oscillating laser beams sweep across the surface of the vehicle at a frequency rate controlled by the oscillating means. If the vehicle has an attitude change, there will be a time difference in the returned signals. The two colors or dual frequencies are detected in the respective receivers with the time shift between receipt of the signals being utilized to determine vehicle attitude. The magnitude of the time of color signal separation varies with the vehicle attitude angle. Thus, for example as shown in FIG. 7, a vehicle disposed substantially horizontal would have no appreciable pitch angle, which would be noted by the vertically moving beam being reflected back from both reflectors substantially simultaneously. If the vehicle is exactly broadside to the beam the reflection from the two reflectors is simultaneous, while any other position can result in a time lag between receipt of the two reflected signals. Similarly, the horizontally sweeping beam will record a maximum time between received pulses for a vehicle disposed broadside to the beam and a lesser time between received pulses as the vehicle changes this yaw attitude. These roles are reversed for the extreme pitch position.

Figure 3:
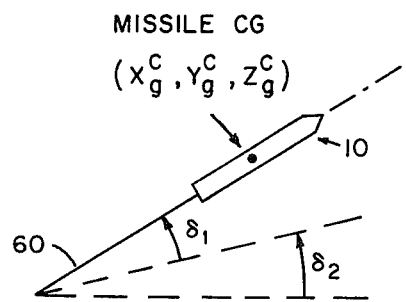
FIGS. 3, 4, and 5 are geometry schematics for identifying the laser aspect angle between the ground station and the retroreflectors.
Figure 3:
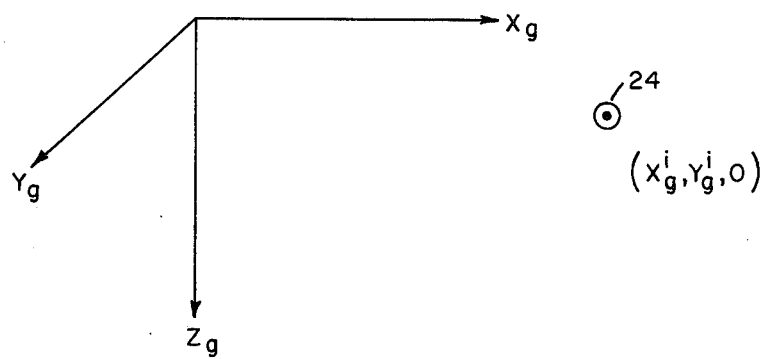
Figure 4:
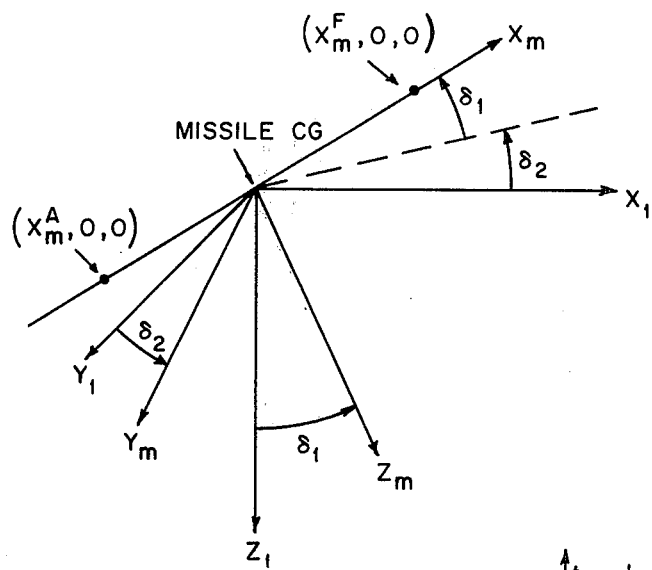
Figure 5:
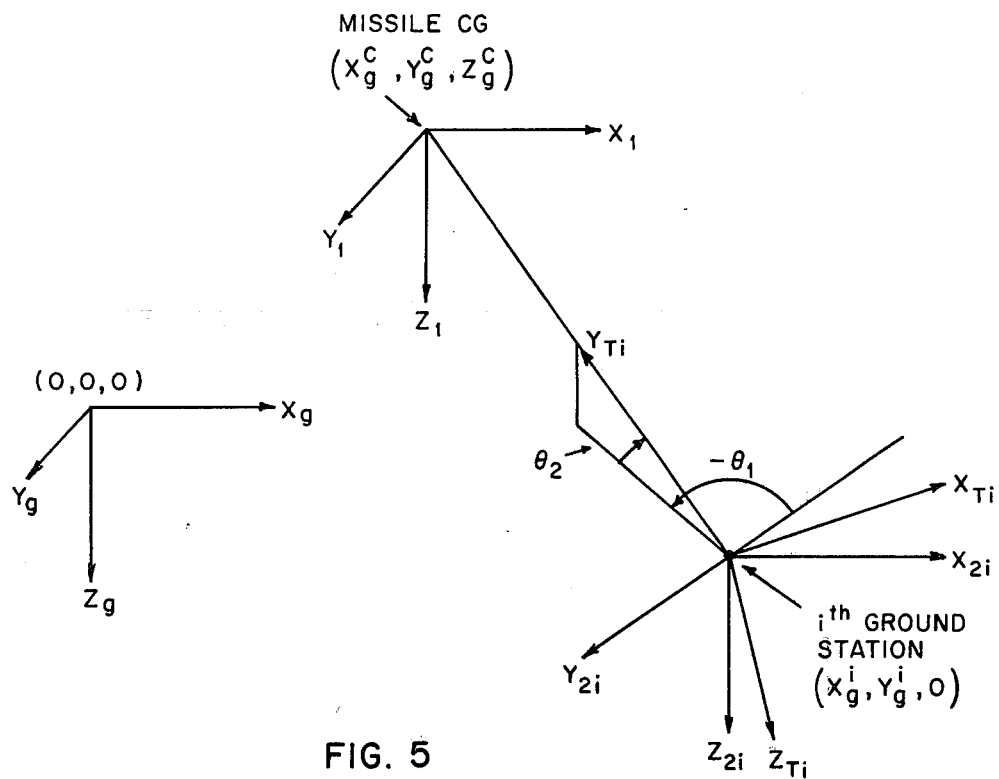
Figure 6:
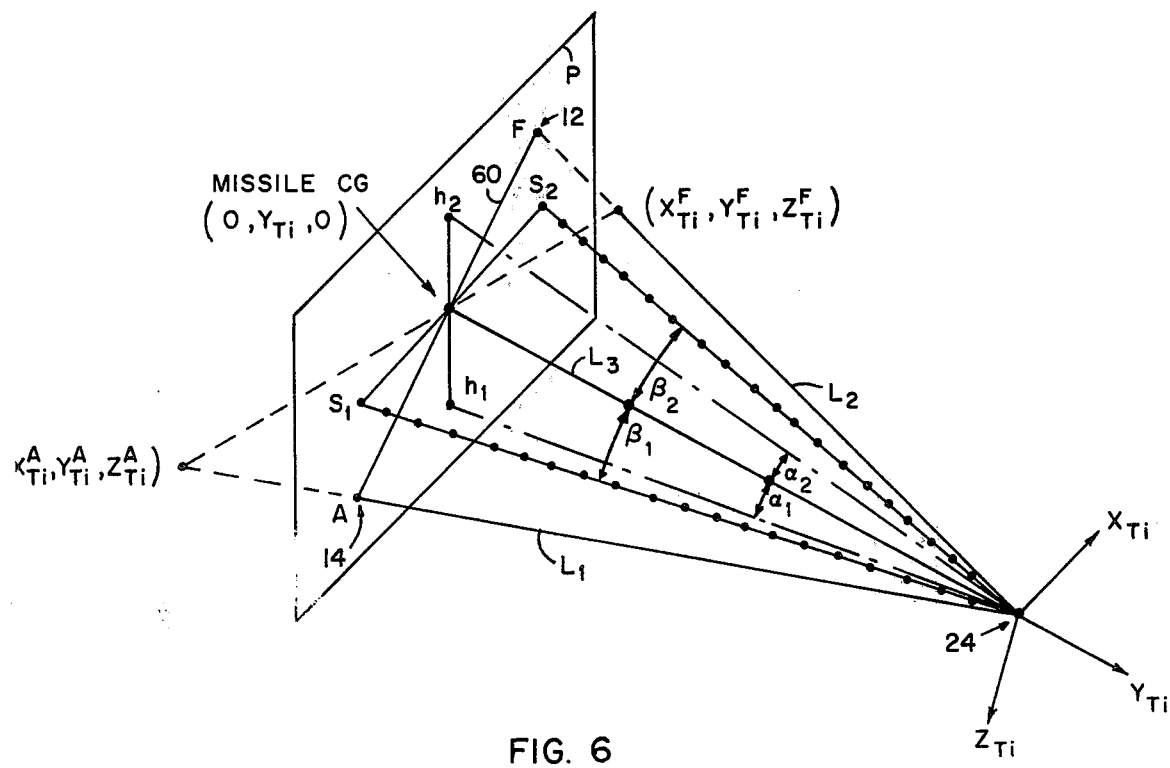

FIG. 3 discloses the geometry for analysis of the tracker system data. As shown geometrically in FIG. 3 the flight vehicle 10 longitudinal axis 60 is projected to a ground plane reference to develop pitch and yaw angles $\delta_1$ and $\delta_2$, respectively in the ground coordinate system $X_g$, $Y_g$, and $Z_g$, which is also the common coordinate system for the ground station 24. FIG. 4 discloses the geometry for transformation of angles $\delta_1$ and $\delta_2$ from the ground coordinate system into the missile body coordinate system or vice versa. FIG. 5 discloses the geometry for transformation of the flight vehicle coordinate system into the ground station coordinate system in a generalized form for any $i^{th}$ ground station. FIGS. 6 and 7 disclose additional geometry for identifying the laser aspect angles. FIG. 6 discloses the geometry for the orientation of the missile position vectors to provide the mathematical solution of the missle attitude (pitch and yaw) angles.

For any $i^{th}$ ground station or tracker 24, position vectors may be readily identified between the ground station and the flight vehicle 10. Thus, as shown in FIG. 6, a plane P may be identified as an instantaneous plane passing through the vehicle 10 along the longitudinal axis 60 and perpendicular to the Y axis at the point (O, $Y_{Ti}^C$, O), which may be the missile center of gravity CG, for example. Transformation of position vectors $L_1$, between tracker 24 and the aft color band 14; $L_2$, between ground station 24 and the forward color band 12; $L_3$, between ground station 24 and the center of gravity into the coordinate system ($X^{Ti}$, $Y_{Ti}$, $Z_{Ti}$) represented at the $i^{th}$ ground station 24 reduces the problem to identifying the instantaneous intersection of the lines $L_1$ and $L_2$ and the plane P.

The intersection of $L_1$ at reflector 14 (point A) is defined by the equations:

$$X_A = X_{Ti}^A \left( \frac{Y_{Ti}^C}{Y_{Ti}^A} \right)$$

$$Y_A = Y_{Ti}^C$$

$$Z_A = Z_{Ti}^A \left( \frac{Y_{Ti}^C}{Y_{Ti}^A} \right)$$

The intersection of $L_2$ at reflector 12 (point F) is defined by the equations:

$$X_F = X_{Ti}^F \left( \frac{Y_{Ti}^C}{Y_{Ti}^F} \right)$$

$$Y_F = Y_{Ti}^C$$

$$Z_F = Z_{Ti}^F \left( \frac{Y_{Ti}^C}{Y_{Ti}^F} \right)$$

FIG. 7 discloses time of pulse reception for the laser beams returned from the respective aft and forward filter bands on the missile. For a vertical beam sweep the timing is as follows: $t_0 =$ beginning of an upward sweep from the lowest Y position, $t_1 =$ time of pulse from reflector 14, and $t_2 =$ time of pulse from reflector 12. For a constant vertical beam sweep rate ($\omega$), the relationship between the time for signal reflection from the filters in terms of their angular location relative to ground station 24 is:

$$\alpha = \omega \Delta t,$$

where $\Delta t$ is the time between the reflector pulses, and $\alpha = \alpha_1 + \alpha_2$ as shown in FIG. 6. Combining the equations using the geometry shown in FIG. 6 and FIG. 7, the relationship for the $i =$ th ground station solution as:

$$\Delta t_{Vi} = \frac{\alpha}{\omega_1} = $$

$$\frac{1}{\omega_1} \left\{ \arctan\left(\frac{-Z_{Ti}^A}{Y_{Ti}^A}\right) + \arctan\left(\frac{Z_{Ti}^F}{Y_{Ti}^F}\right) \right\}$$

For a dual sweeping system four pulses of light are generated which may be viewed as two independent time intervals:

$$\Delta t_V = \frac{1}{\omega_1}\left\{\tan^{-1}\left(\frac{-Z_{Ti}^A}{Y_{Ti}^A}\right) + \tan^{-1}\left(\frac{Z_{Ti}^F}{Y_{Ti}^F}\right)\right\}$$

$$\Delta t_H = \frac{1}{\omega_2}\left\{\tan^{-1}\left(\frac{-X_{Ti}^A}{Y_{T2}^A}\right) + \tan^{-1}\left(\frac{X_{Ti}^F}{Y_{T2}^F}\right)\right\}$$

These two simultaneous equations can be solved using well known mathematical techniques. Solution is similar to that utilized in equations (1) and (2) of Patent Application Ser. No. 697,308, filed June 18, 1976, now U.S. Pat. No. 4,047,816 and entitled "Attitude Determination Using Two Transmitter/Receiver Stations and Skewed Reflectors." U.S. Pat. No. 4,047,816 was filed by inventors Pell and Brown, two of the co-inventors of the instant invention. Three sweeping options are available. The horizontal and vertical sweeping beams can be swept at the same angular rate in phase to provide an effective sweep angle for the combined beams of 45° (relative to horizontal). Alternately the beams may be swept at different angular rates (still phased) to provide effective sweep angles other than 45°. In addition the sweep could do decoupled to provide a vertical sweep followed in time by a horizontal sweep or vice versa.

Obviously, the reflector bands 12 and 14 are not physically located along the vehicle longitudinal axis. However, for precise determination, this fixed, known position can readily be compensated for. For measurements where the distance from the tracking station to the vehicle greatly exceeds the dislocation of the reflectors from the axis, as for example by an order of 100, compensation is unnecessary since any error in mesurement becomes negligible.

Thus, with the tracking station having known coordinates and the filtered, color band reflectors having established coordinates on the surface of the vehicle, retroreflected pulse reception time at the ground station or stations allow vehicle position and attitude (pitch and yaw) to be obtained in near real time.

Although a particular embodiment and form of the invention has been described, it will be obvious to those skilled in the art that modifications may be made without departing from the scope and spirit of the invention. For example, the retroreflectors may be inclined to the vehicle surface to face the surfaces more toward the aft end of the vehicle to enhance the duration of tracing by a particular station at the rear of the vehicle. Similarly, additional tracking stations may be selectively prepositioned downrange of the vehicle trajectory for picking up the vehicle when it comes within range. Accordingly, it is understood that the invention is limited only by the claims appended hereto.

We claim:

1. In a tracking system for determining the spatial attitude of an object having a longitudinal reference axis and wherein optical energy is directed from a tracking station toward the object and reflected back to the tracking station from the object, the improvement comprising: first and second optical reflector arrays, each array being disposed in a continuous circumferential band around the surface of said object, said reflectors being spaced apart in first and second planes parallel to each other and normal to the longitudinal axis for retroreflecting the impinging optical energy from said reflectors along a vector path to said tracking station; first and second optical filters respectively covering said first and second optical reflector arrays for providing retroreflection in respective first and second narrow bands of the optical spectrum; and said tracking station being adapted for transmitting first and second swept laser beams across said object and for receiving and differentiating between retroreflected laser energy from said first and second reflector arrays.

2. A tracking system as set forth in claim 1 wherein said tracking station comprises first and second multimode, continuous wave lasers each emitting a single beam having at least two colors therein which match the respective first and second narrow band filters; first and second photosensitive detectors and third and fourth optical filters respectively disposed for filtering and detecting retroreflected pulses of the respective colored retroreflected beams; and receiver means adapted to receive output signals from said detectors for providing vehicle attitude data.

3. A tracking system as set forth in claim 2 wherein said tracking station further comprises a first and second reflecting means for directing laser energy and retroreflected energy to and from said tracker, said second means having a multifaceted, rotatable surface to provide a sweeping laser beam; and first and second diverging lens adapted to shape the transmitted laser beams into respective rectangular cross-section beams.

4. In a tracking system having a transmitter-receiver adapted for tracking a moving vehicle wherein retroreflector arrays are disposed on the surface of said vehicle, a method of detecting the attitude of said vehicle comprising the steps of:
launching a vehicle into a general flight trajectory;
sweeping first and second beams of optical energy from a single ground station across said vehicle;
filtering said optical energy impinging on said retroreflector arrays from said tracking station for retroreflecting separate and distinct frequencies from respective arrays;
retroreflecting impinging energy of said optical energy from said first and second retroreflector arrays on the surface of said vehicle back toward said ground station; and
receiving said retroreflected energy by said tracking station for processing to provide vehicle attitude.

5. A method of detecting the attitude of a moving vehicle as set forth in claim 4 and further comprising the step of:
positioning said first and second reflector arrays on the surface of said vehicle prior to launch in first and second parallel planes normal to said vehicle longitudinal axis.

6. A method of detecting the attitude of moving vehicle as set forth in claim 5 and further comprising the steps of:
sweeping said first and second beams of optical energy in respective first and second directions across said moving vehicle; and
shaping said optical energy beams into first and second rectangular shaped beams for sweeping across said vehicle.

* * * * *

UNITED STATES PATENT AND TRADEMARK OFFICE
CERTIFICATE OF CORRECTION

PATENT NO. : 4,123,165

DATED : October 31, 1978

INVENTOR(S) : David B. Brown, Jerry W. Vickers, and Kynric M. Pell

It is certified that error appears in the above-identified patent and that said Letters Patent are hereby corrected as shown below:

Column 4, line 7, change "$X^{Ti}$" to read --$X_{Ti}$--.

Column 5, line 10, in the equation change "$\tan^{1}$" to read --$\tan^{-1}$--; and line 30, change "do" to read --be--.

Signed and Sealed this

*Thirteenth* Day of *March 1979*

[SEAL]

Attest:

RUTH C. MASON
*Attesting Officer*

DONALD W. BANNER
*Commissioner of Patents and Trademarks*